US012548943B2

(12) United States Patent
Li et al.

(10) Patent No.: US 12,548,943 B2
(45) Date of Patent: Feb. 10, 2026

(54) ELECTRICAL CONNECTOR WITH PARTIAL HOUSING COATING

(71) Applicant: Advanced Connectek Inc., New Taipei (TW)

(72) Inventors: Yubin Li, New Taipei (TW); Guan Liao, New Taipei (TW); Shu-Fen Wang, New Taipei (TW)

(73) Assignee: Advanced Connectek Inc., New Taipei (TW)

( * ) Notice: Subject to any disclaimer, the term of this patent is extended or adjusted under 35 U.S.C. 154(b) by 363 days.

(21) Appl. No.: 18/296,347

(22) Filed: Apr. 5, 2023

(65) Prior Publication Data

US 2023/0327370 A1 Oct. 12, 2023

(30) Foreign Application Priority Data

Apr. 11, 2022 (CN) ......................... 202210371935.5

(51) Int. Cl.
*H01R 13/52* (2006.01)
*H01R 13/506* (2006.01)

(52) U.S. Cl.
CPC ....... *H01R 13/5219* (2013.01); *H01R 13/506* (2013.01); *H01R 13/5216* (2013.01)

(58) Field of Classification Search
None
See application file for complete search history.

(56) References Cited

U.S. PATENT DOCUMENTS

| | | | | |
|---|---|---|---|---|
| 2005/0159040 A1* | 7/2005 | Brunker | H01R 13/6461 439/497 |
| 2013/0164982 A1* | 6/2013 | Zhang | H01R 13/03 439/607.46 |
| 2015/0194761 A1* | 7/2015 | Xie | H01R 24/60 439/521 |
| 2016/0164218 A1* | 6/2016 | Lee | H01R 13/5202 439/587 |
| 2018/0366862 A1* | 12/2018 | Zhao | H01R 13/41 |
| 2020/0259292 A1* | 8/2020 | Hsu | H01R 13/5202 |

* cited by examiner

*Primary Examiner* — Oscar C Jimenez
(74) *Attorney, Agent, or Firm* — JCIPRNET

(57) ABSTRACT

An electrical connector including an insulating body, multiple terminals, a first housing, and a sealing ring is provided. The terminals are disposed in the insulating body. The first housing is assembled to the insulating body and surrounds the insulating body and the terminals. An exterior wall of the first housing is divided into a first area and a second area which are different from each other. A coating layer is disposed onto a surface of the second area. A surface of the first area is a raw material surface of the first housing. The sealing ring is disposed in the first area.

12 Claims, 3 Drawing Sheets

ELECTRICAL CONNECTOR WITH PARTIAL HOUSING COATING

CROSS-REFERENCE TO RELATED APPLICATION

THIS APPLICATION CLAIMS THE PRIORITY BENEFIT OF CHINA APPLICATION SERIAL NO. 202210371935.5, FILED on Apr. 11, 2022. THE ENTIRETY OF THE ABOVE-MENTIONED PATENT APPLICATION IS HEREBY INCORPORATED BY REFERENCE HEREIN AND MADE A PART OF THIS SPECIFICATION.

BACKGROUND

Technical Field

The disclosure relates to an electrical connector.

Description of Related Art

With the continuous advancement of information technology, in order to improve the performance of computers or digital electronic products, functions can be expanded through external electronic devices with various functions. Usually, electrical connectors are installed in the computers or electronic products to achieve connection with external electronic devices.

As a standard input/output interface, the Universal Serial Bus (USB) interface has been widely used in many electronic products to realize mutual transmission between signals. Due to different use environments of products, different products have different performance requirements for electrical connectors, such as special requirements for waterproof or dustproof performance. In addition, the characteristics of electrical connectors tend to be miniaturized, and the requirements for their structural strength and stability also increase.

SUMMARY

The disclosure provides an electrical connector, in which an exterior wall of a first housing can be stably configured with a sealing ring through a coating layer or not.

The electrical connector of the disclosure includes an insulating body, multiple terminals, a first housing, and a sealing ring. The terminals are disposed in the insulating body. The first housing is assembled to the insulating body and surrounds the insulating body and the terminals. An exterior wall of the first housing is divided into a first area and a second area which are different from each other. A coating layer is disposed onto a surface of the second area. A surface of the first area is a raw material surface of the first housing. The sealing ring is disposed in the first area.

In an embodiment of the disclosure, the above-mentioned first housing has a pair of first pins located on opposite sides of the insulating body, and the first pins are configured to be soldered on a circuit board.

In an embodiment of the disclosure, the above-mentioned first housing is a metal injection molding (MIM) housing.

In an embodiment of the disclosure, the above-mentioned coating layer is a coating layer including at least one material of tin, nickel, or gold.

In an embodiment of the disclosure, the above-mentioned first area surrounds an interface of the first housing, the second area is far away from the interface, and the electrical connector is connected to another electrical connector through the interface.

In an embodiment of the disclosure, the above-mentioned sealing ring is a liquid silicone rubber injection moulding (LIM) ring.

In an embodiment of the disclosure, the above-mentioned insulating body includes a base and a tongue portion extending from the base. A part of the base is assembled in the first housing, and the tongue portion penetrates through the first housing.

In an embodiment of the disclosure, the above-mentioned electrical connector further includes a second housing, which is assembled to and covers the other part of the base. The above-mentioned part is connected between the above-mentioned tongue portion and the other part.

In an embodiment of the disclosure, the above-mentioned second housing has a pair of second pins located on opposite sides of the other part, and the second pins are configured to be soldered on the circuit board.

In an embodiment of the disclosure, the above-mentioned second housing is a stamped and bent housing.

Based on the above, the first housing of the electrical connector is configured to surround and accommodate the insulating body and the terminals. The exterior wall of the first housing is divided into the first area and the second area which are adjacent to but different from each other. A coating layer is disposed onto the surface of the second area. The surface of the first area is the raw material surface of the first housing without the disposition of the coating layer. In this way, the sealing ring may be disposed in the first area to effectively combine with the first housing, that is, because the coating layer is not provided, the binding force of the sealing ring and the first housing being reduced by the coating layer may be prevented, thereby improving the tolerance of the sealing ring and the overall structural strength of the electrical connector.

DESCRIPTION OF THE EMBODIMENTS

Figure 1:
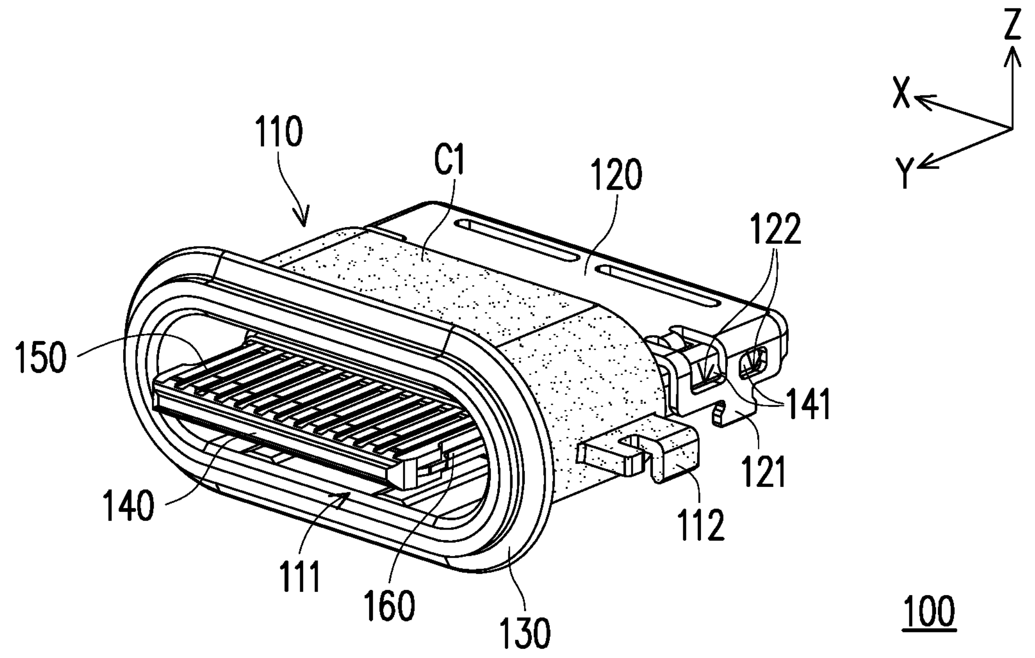
FIG. 1 is a schematic diagram of an electrical connector according to an embodiment of the disclosure.
Figure 2:
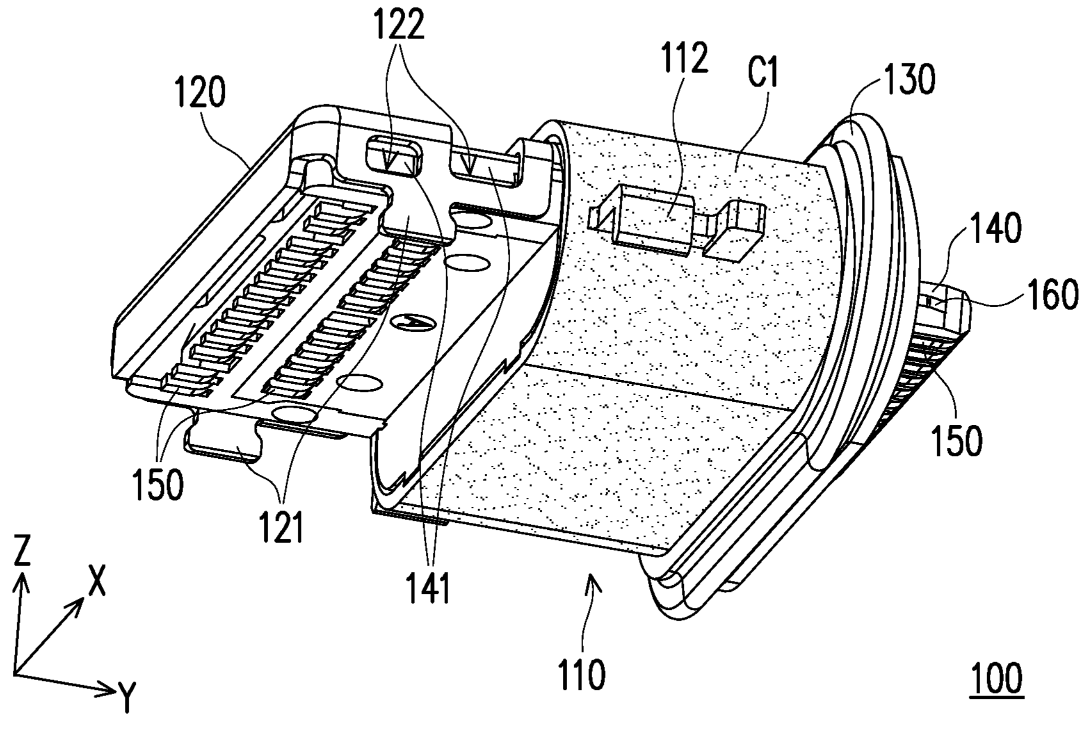
FIG. 2 is a schematic diagram of the electrical connector of FIG. 1 from another perspective.
Figure 3:
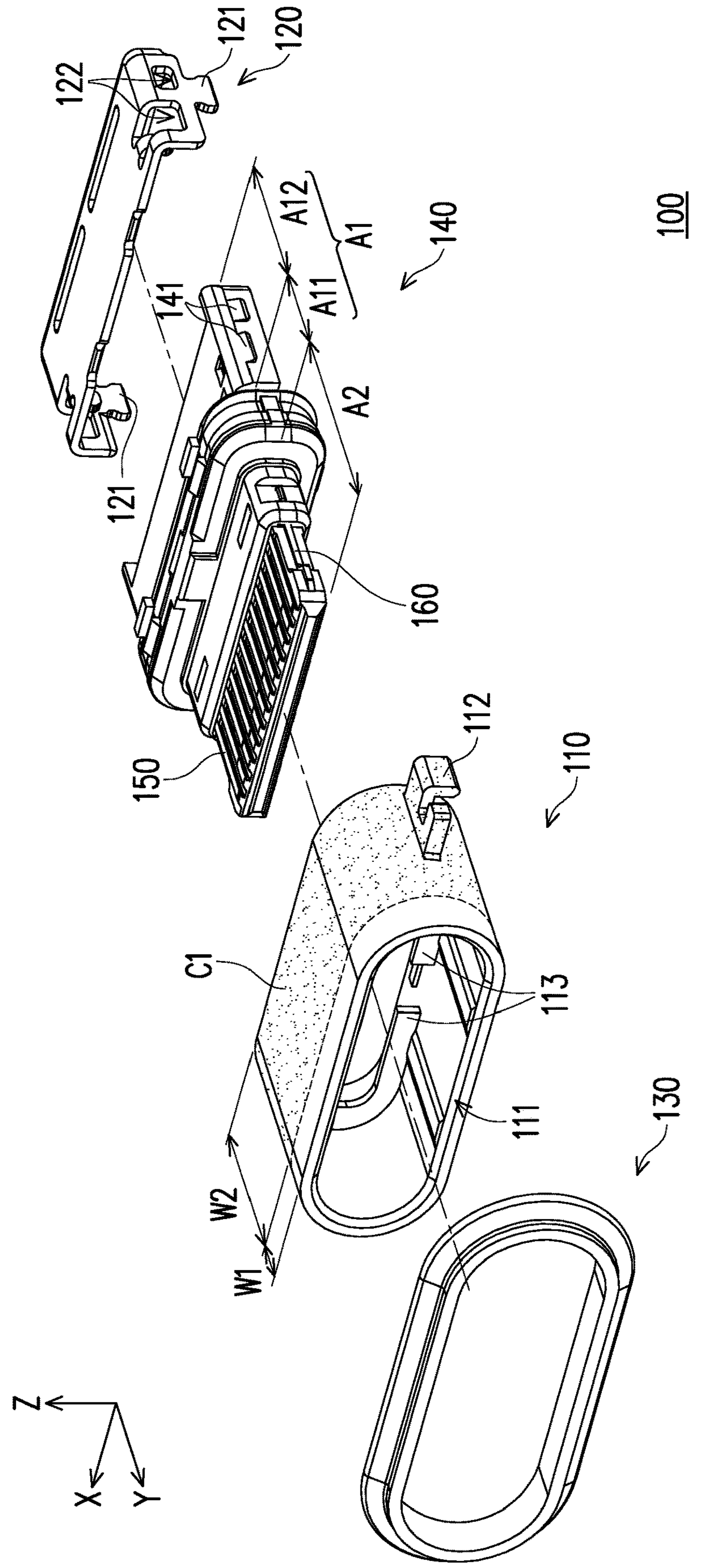
FIG. 3 is an exploded schematic view of the electrical connector of FIG. 1.

FIG. 1 is a schematic diagram of an electrical connector according to an embodiment of the disclosure. FIG. 2 is a schematic diagram of the electrical connector of FIG. 1 from another perspective. FIG. 3 is an exploded schematic view of the electrical connector of FIG. 1. Cartesian coordinates XYZ are provided to facilitate component description. Please refer to FIG. 1 to FIG. 3 at the same time. In the embodiment, an electrical connector 100 includes an insulating body 140, multiple terminals 150, a first housing 110, and a sealing ring 130. The terminals 150 are disposed in the insulating body 140. The first housing 110 is assembled to the insulating body 140 and surrounds the insulating body 140 and the terminals 150. The exterior wall of the first housing 110 is divided into a first area W1 and a second area W2 which are different from each other. A coating layer C1 is disposed onto a surface of the second area W2. A surface of the first area W1 is a raw material surface of the first housing 110 without the disposition of the coating layer C1. The sealing ring 130 is disposed in the first area W1. In the embodiment, the sealing ring 130 is a liquid silicone rubber injection moulding (LIM) ring, that is, after the first housing 110 is completed, the liquid silicone is then molded on the first area W1 of the first housing 110 by an injection molding process to form the sealing ring 130. It should be noted that the dotted line beside the coating layer C1 shown in FIG. 3 is only used as a separation between the first area W1 and the second area W2, rather than a pattern of dotted lines on the surface of the exterior wall.

In the embodiment, the sealing ring 130 is located at an interface 111 of the first housing 110, and in fact, the electrical connector 100 is, for example, a receptacle electrical connector, which is adapted to be disposed in the body of an electronic device. Therefore, the sealing ring 130 is also installed in the body along with the electrical connector 100, and is tightly connected with the body structure to produce waterproof or dustproof effects, so as to ensure that moisture or foreign matter does not enter the body through the electrical connector 100.

Further, the first housing 110 in the embodiment is a metal injection molding (MIM) housing. The above-mentioned interface 111 is the place where the first housing 110 is connected to another electrical connector (not shown). The first area W1 surrounds the interface 111 of the first housing 110, and the second area W2 is far away from the interface 111. The insulating body 140 includes a base A1 and a tongue portion A2 extending from the base A1. A part of the base A1 is assembled in the first housing 110 and is stopped by protruding ribs 113 of the first housing 110, and the tongue portion A2 passes through the first housing 110 and partially protrudes from the interface 111. In another unillustrated embodiment, the first housing 110 may also be made by a process such as stamping and bending, or drawing of a metal plate.

In the embodiment, the electrical connector 100 further includes a metallic sheet 160, which is combined with the insulating body 140 by insert molding like the terminals 150. The metallic sheet 160 is also a shielding sheet. The metallic sheet 160 separates the terminals 150 into two groups, that is, the two groups of terminals 150 are disposed above and below relative to the metallic sheet 160 along a Z axial direction. Meanwhile, in addition to the above-mentioned configuration of the terminals 150 in the embodiment, the electrical pin assignments of the terminals 150 along an X axial direction are arranged in opposite states. Simply put, taking FIG. 3 as an example, if the electrical pin assignments of the terminals 150 located above the metallic sheet 160 are arranged in the positive X axial direction (for example, from right to left are pin1, pin2, . . . pin12), the electrical pin assignments of the terminals 150 located under the metallic sheet 160 are arranged in the negative X axial direction (for example, from right to left are pin12, pin11, . . . pin1), so as to facilitate that another electrical connector can be smoothly connected to the electrical connector 100 no matter in the positive or reverse inserting manner, thereby improving the application range of the electrical connector 100.

Furthermore, the base A1 is divided into two parts A11 and A12 along a Y axial direction, and the part A11 is connected between the tongue portion A2 and the part A12. The electrical connector 100 further includes a second housing 120, which is formed by stamping and bending or drawing of a metal plate, for example. In the embodiment, the second housing 120 has an opening 122, and the part A12 of the base A1 of the insulating body 140 has buckle protrusions 141, so that when the second housing 120 covers the part A12, the buckle protrusions 141 are fastened to the opening 122 to complete the assembly of the second housing 120 and the insulating body 140. In the embodiment, each of the terminals 150 substantially starts from the part A12 and extends to the tongue portion A2 after passing through the part A11. In other words, each of the terminals 150 has a soldering end and a connecting end. The soldering end protrudes from the part A12, as shown in FIG. 2, which is configured to be soldered to a pad of a circuit board 170 (shown in FIG. 4), and the connecting end is exposed from the tongue portion A2, so as to be connected with the terminal of the aforementioned another electrical connector.

Figure 4:
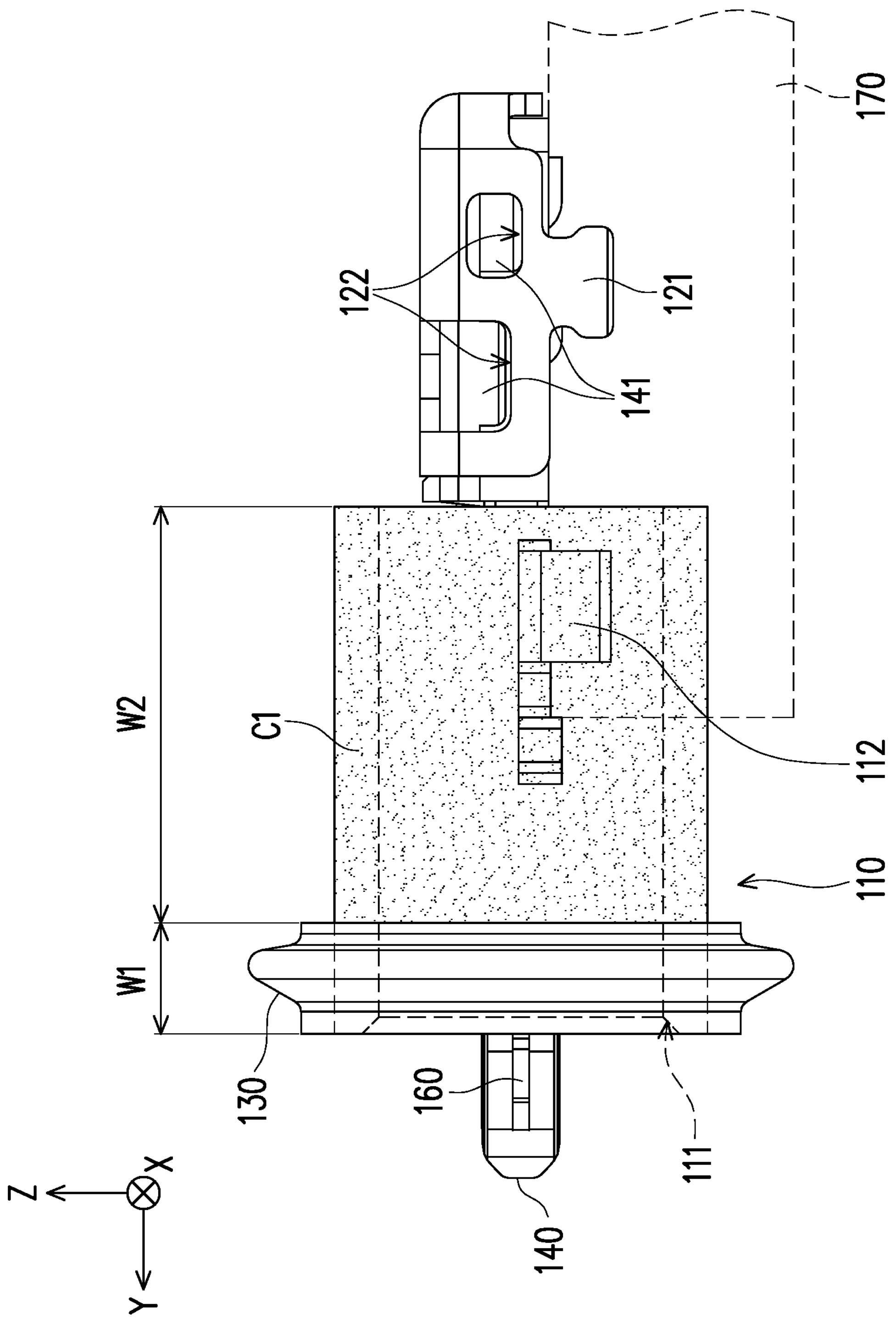
FIG. 4 is a side view of the electrical connector of FIG. 1 disposed on a circuit board.

FIG. 4 is a side view of the electrical connector of FIG. 1 disposed on a circuit board. Please refer to FIG. 3 and FIG. 4 at the same time. In the embodiment, the electrical connector 100 is, for example, a receptacle electrical connector, which is adapted to be disposed on a circuit board (e.g., the circuit board 170 shown in FIG. 4) in an electronic device. In order to achieve the aforementioned effects, the first housing 110 of the embodiment further has a pair of first pins 112 located on opposite sides of the body of the first housing 110 along the X axial direction, and the first pins 112 are configured to be inserted into the circuit board 170 and soldered to obtain an electrical connection. Meanwhile, the second housing 120 of the embodiment also has two second pins 121 disposed along the X axial direction, which are also configured to be inserted into the circuit board 170 and soldered to obtain the electrical connection. In the embodiment, the first pins 112 are substantially located on opposite sides of the part A11 along the X axial direction, and the second pins 121 are substantially located on opposite sides of the part A12 along the X axial direction.

In this way, as shown in FIG. 4, the first housing 110 uses the first pins 112, the second housing 120 uses the second pins 121, and the first pins 112 and the second pins 121 are substantially located on the same plane, so as to be supported and stably fixed on the circuit board 170. More importantly, for the first housing 110, the first pins 112 are located in the aforementioned second area W2. In other words, the coating layer C1 is also provided on the surface of the first pins 112, especially an electroplating layer including tin, nickel, or gold, which facilitates the soldering between the first pins 112 and the circuit board 170. Similarly, a coating layer may also be disposed on the surface of the second housing 120 to facilitate the soldering between the second pins 121 and the circuit board 170. In another unillustrated embodiment, a coating layer of other materials may also be disposed in the second area W2 of the first housing due to other requirements (such as appearance or visual effects). However, similarly, the first area W1 still maintains the raw material surface without the coating layer due to the need to form the sealing ring 130.

In summary, in the above-mentioned embodiments of the disclosure, the electrical connector has the first housing, which is configured to surround and accommodate the insulating body and the terminals. The exterior wall of the first housing is divided into the first area and the second area which are adjacent to but different from each other. A coating layer is disposed onto the surface of the second area, but the coating layer is not disposed onto the surface of the first area. In this way, the sealing ring may be disposed in the first area to effectively combine with the first housing, that is, because the coating layer is not provided, the binding force of the sealing ring and the first housing being reduced by the coating layer may be prevented, thereby improving the tolerance of the sealing ring and the overall structural strength of the electrical connector. At the same time, the first pins of the first housing for being soldered on the circuit board are located in the second area, that is, the coating layer is provided on the surface of the first pins, thereby facilitating the soldering of the first pins and the circuit board

What is claimed is:

1. An electrical connector, comprising:

an insulating body;

a plurality of terminals, disposed in the insulating body;

a first housing, assembled to the insulating body and surrounding the insulating body and the plurality of terminals, an exterior wall of the first housing being divided into a first area and a second area which are adjacent to but different from each other, a coating layer being disposed onto a surface of the second area, and a surface of the first area being a raw material surface of the first housing; and a sealing ring, disposed in the first area.

2. The electrical connector according to claim 1, wherein the first housing has a pair of first pins located on opposite sides of the insulating body, and the first pins are located in the first second area and configured to be soldered on a circuit board.

3. The electrical connector according to claim 1, wherein the first housing is a metal injection molding (MIM) housing.

4. The electrical connector according to claim 1, wherein the coating layer is a coating layer comprising at least one material of tin, nickel, or gold.

5. The electrical connector according to claim 1, wherein the first area surrounds an interface of the first housing, the second area is far away from the interface, and the electrical connector is connected to another electrical connector through the interface.

6. The electrical connector according to claim 1, wherein the sealing ring is a liquid silicone rubber injection moulding (LIM) ring.

7. The electrical connector according to claim 1, wherein the insulating body comprises a base and a tongue portion extending from the base, a part of the base is assembled in the first housing, and the tongue portion passes through the first housing.

8. The electrical connector according to claim 7, further comprising a second housing, assembled to and covering the other part of the base, and the part being connected between the tongue portion and the other part.

9. The electrical connector according to claim 8, wherein the second housing has a pair of second pins located on opposite sides of the other part, and the second pins are configured to be soldered on a circuit board.

10. The electrical connector according to claim 8, wherein the second housing is a stamped and bent housing.

11. An electrical connector, comprising:

an insulating body;

a plurality of terminals, disposed in the insulating body;

a first housing, wherein the first housing is a unitary, single-piece body, assembled to the insulating body and surrounding the insulating body and the plurality of terminals, an exterior wall of the unitary, single-piece body being divided into a first area and a second area which are adjacent to but different from each other, a coating layer being disposed onto a surface of the second area, and a surface of the first area being a raw material surface of the first housing; and a sealing ring, disposed in the first area.

12. An electrical connector, comprising:

an insulating body;

a plurality of terminals, disposed in the insulating body;

a first housing, assembled to the insulating body and surrounding the insulating body and the plurality of terminals, an exterior wall of the first housing being divided into a first area and a second area which are adjacent to but different from each other, a coating layer being disposed onto a surface of the second area, and a surface of the first area being a raw material surface of the first housing, wherein the coating layer is an electroplating layer provided on the raw material surface; and a sealing ring, disposed in the first area.

* * * * *